United States Patent
Feichtinger

(10) Patent No.: US 6,726,254 B2
(45) Date of Patent: Apr. 27, 2004

(54) FUEL CONTAINER AND ITS CONNECTION WITH A PIPE

(75) Inventor: Stefan Feichtinger, Anger (AT)

(73) Assignee: Tesma Motorne und Getriebetechnik GmbH, Presding (AT)

(*) Notice: Subject to any disclaimer, the term of this patent is extended or adjusted under 35 U.S.C. 154(b) by 0 days.

(21) Appl. No.: 10/008,807

(22) Filed: Nov. 13, 2001

(65) Prior Publication Data

US 2002/0074802 A1 Jun. 20, 2002

(30) Foreign Application Priority Data

Nov. 13, 2000 (AT) .................................... 833/2000 U

(51) Int. Cl.[7] ............................................... F16L 19/00
(52) U.S. Cl. ........................ 285/365; 285/364; 285/407
(58) Field of Search ................................. 285/363, 364, 285/365, 351, 374, 406, 407, 415, 420; 24/20 R, 20 EE, 20 W

(56) References Cited

U.S. PATENT DOCUMENTS

| 3,173,710 | A | * | 3/1965 | Kinnison | 285/9.2 |
| 3,584,902 | A | * | 6/1971 | Vyse | 285/305 |
| 4,832,380 | A | * | 5/1989 | Oetiker | 285/328 |
| 5,005,876 | A | * | 4/1991 | Fahl | 285/311 |
| 5,048,875 | A | * | 9/1991 | Usui et al. | 285/319 |
| 5,094,494 | A | * | 3/1992 | McConnell | 285/318 |
| 5,386,923 | A | * | 2/1995 | Nakashima et al. | 220/86.2 |
| 5,390,808 | A | * | 2/1995 | Choma et al. | 220/86.2 |
| 5,413,386 | A | * | 5/1995 | Dal Palu | 285/123.1 |
| 5,556,138 | A | * | 9/1996 | Nakajima et al. | 285/124.4 |
| 5,634,673 | A | * | 6/1997 | Miyazaki et al. | 285/148.5 |
| 5,647,612 | A | * | 7/1997 | Yoshida et al. | 285/13 |
| 6,041,824 | A | * | 3/2000 | Powell | 138/109 |
| 6,053,537 | A | * | 4/2000 | Guest | 285/148.19 |
| 6,257,627 | B1 | * | 7/2001 | Fujiwara et al. | 285/305 |

FOREIGN PATENT DOCUMENTS

| AT | 004 235 U1 | | 1/2000 | | |
| DE | 35 09 774 A1 | * | 10/1986 | | 282/420 |
| FR | 197804 | * | 3/1978 | | 285/351 |
| FR | 2 699 981 A1 | * | 12/1992 | | 285/420 |

* cited by examiner

Primary Examiner—Lynne H. Browne
Assistant Examiner—James M. Hewitt
(74) Attorney, Agent, or Firm—Clark Hill PLC

(57) ABSTRACT

A fuel container with a pipe, the fuel container having a pipe connecting piece with a conically widened rim and the pipe having an annular bead, on which a connecting member acts, and a sealing ring further being seated between the conically widened rim and the annular bead. In order to make the connection such that it can be produced simply and accurately, and to make it quite tightly, on the side of the annular bead facing the pipe connecting piece, the pipe forms a cylinder with two circumferential grooves, in each of which a sealing ring is seated, which rests in a sealing manner on the cylindrical inner surface of the pipe connecting piece. The annular bead has a cross section with two oblique flanks, the conically widened rim of the pipe connecting piece resting on the flank facing the pipe connecting piece, and the connecting member acting on the flank facing away.

7 Claims, 2 Drawing Sheets

FUEL CONTAINER AND ITS CONNECTION WITH A PIPE

BACKGROUND OF THE INVENTION

1. Field of the Invention

The present invention relates to a fuel container with a pipe. More particularly, the present invention relates to a fuel container having a pipe connecting piece with a rim and a pipe having an annular bead on which a connecting member acts, and a sealing ring further being seated between the rim and the annular bead.

2. Description of the Related Art

In order to avoid emissions, the connection between a fuel container and pipe should not only be liquid-tight but also gas tight. This also includes a requirement that as little fuel vapors as possible should diffuse through the seals between the fuel container and pipe.

In applicant's co-pending application GM 41/2000 for an Austrian registered design, a connection between two pipe parts for the same purpose is proposed, and has the features of the preamble. In the case of this connection, only one sealing ring is provided, which forms a semi-radial seal and therefore also has to be compressed in the axial direction, to the detriment of its sealing action. Since the sealing ring is contacted by fuel vapors on one side and, on the outer side, is connected to the ambient air, fuel vapors are able to diffuse through it.

In addition, during assembly this arrangement can lead to a nonuniform seat or even to damage to the sealing ring, particularly if the pipe is inserted crookedly or if there is a lack of axial guidance. In addition, the connection should also be easy to produce and to release again, even at locations of difficult access, and without overcompressing the sealing ring, which is not ensured in the case of the semi-radial position and the uncontrollable tightening torque on the nut. The act of compression by means of a union nut is complicated and requires that the union nut be put on before the annular bead is formed, and in addition the connection can loosen during operation. Finally, in the case of this known arrangement, it is not beneficial to provide a second sealing ring, since this would be complicated in design terms and would reduce the clear diameter.

It is therefore an object of the invention to remedy these disadvantages and to improve the connection to the effect that, with minimum constructional expenditure, it can be produced and also released again simply and accurately and, in addition, is quite tight.

SUMMARY OF THE INVENTION

According to one aspect of the invention, this is achieved by the pipe, on the side of the annular bead facing the pipe connecting piece, forming a cylinder with two circumferential grooves, in each of which a sealing ring is seated, which rests in a sealing manner on the cylindrical inner surface of the pipe connecting piece, and by the annular bead having a cross section with two oblique flanks, the conically widened rim of the pipe connecting piece resting on the flank facing the pipe connecting piece, and the connecting member acting on the flank facing away.

Therefore, during assembly, the sealing rings are no longer pressed together to a predetermined extent in the radial direction during assembly, which means that they can no longer be overcompressed. This arrangement also makes it possible to provide two sealing rings on the same radius, that is to say to improve the sealing substantially, without reducing the clear width. The sealing rings can be premounted in the radial grooves on the pipe, which then merely has to be plugged into the pipe connecting piece. The widened rim of the pipe connecting piece prevents damage to the sealing ring during assembly. The flank of the annular bead facing the pipe connecting piece rests on the conically widened rim of the pipe connecting piece. As a result, a true-angle connection is provided and a certain sealing action is also already achieved, which ensures that the outer sealing ring is not in contact with the surroundings and that, in this way, by impoverishing the space in front of and behind this sealing ring, diffusion is also brought to a standstill, and the impoverishment also simultaneously constitutes a safeguard against contamination.

In a development of the invention, the cross section of the grooves is circular, the radius of the circle being greater than that of the sealing rings. As a result, not only are the sealing rings looked after, but also the sealing action is improved, since the sealing ring, pressed together radially during assembly, then fills the entire area of the groove. The greater radius of the grooves results in a particularly narrow gap in the second sealing stage. In order to maximize the sealing action, the first sealing ring, closer to the fuel container, can comprise a fuel-resistant elastomer, and the more remote second sealing ring can comprise an elastomer with a vapor barrier action.

In an advantageous embodiment of the invention, the connecting member is a clip which is open at at least one point and, in cross section, has two oblique flanks, one of which rests on the conically widened rim of the pipe connecting piece and the other rests on that flank of the annular bead which faces away from the pipe connecting piece. Because the conical widening of the pipe connecting pipe rests on the oblique flank of the pipe, and because of the radial sealing, the compression force during assembly does not need to be limited. This permits the use of a clip which, in cooperation with the two oblique flanks, ensures a firm connection. However, other connecting members are also conceivable. In a development of this embodiment, the clip comprises two halves each forming a semicircle and connected to each other at their ends and having, at their ends, radially outwardly projecting ears, one ear being longer in the radial direction and one being shorter, and the connection being produced by folding the longer ear around the shorter. In this way, the halves of the clip can be positioned in one operation and also firmly connected to each other at the same time. Nevertheless, the connection can also be released again easily by bending the ears up. If, finally, each half of the clip has a long ear at one end and a short ear at the other end, the two halves of the clip are identical parts.

BRIEF DESCRIPTION OF THE DRAWINGS

In the following text, the invention will be described and explained by using figures, in which.

DETAILED DESCRIPTION OF THE PREFERRED EMBODIMENT

Figure 1:
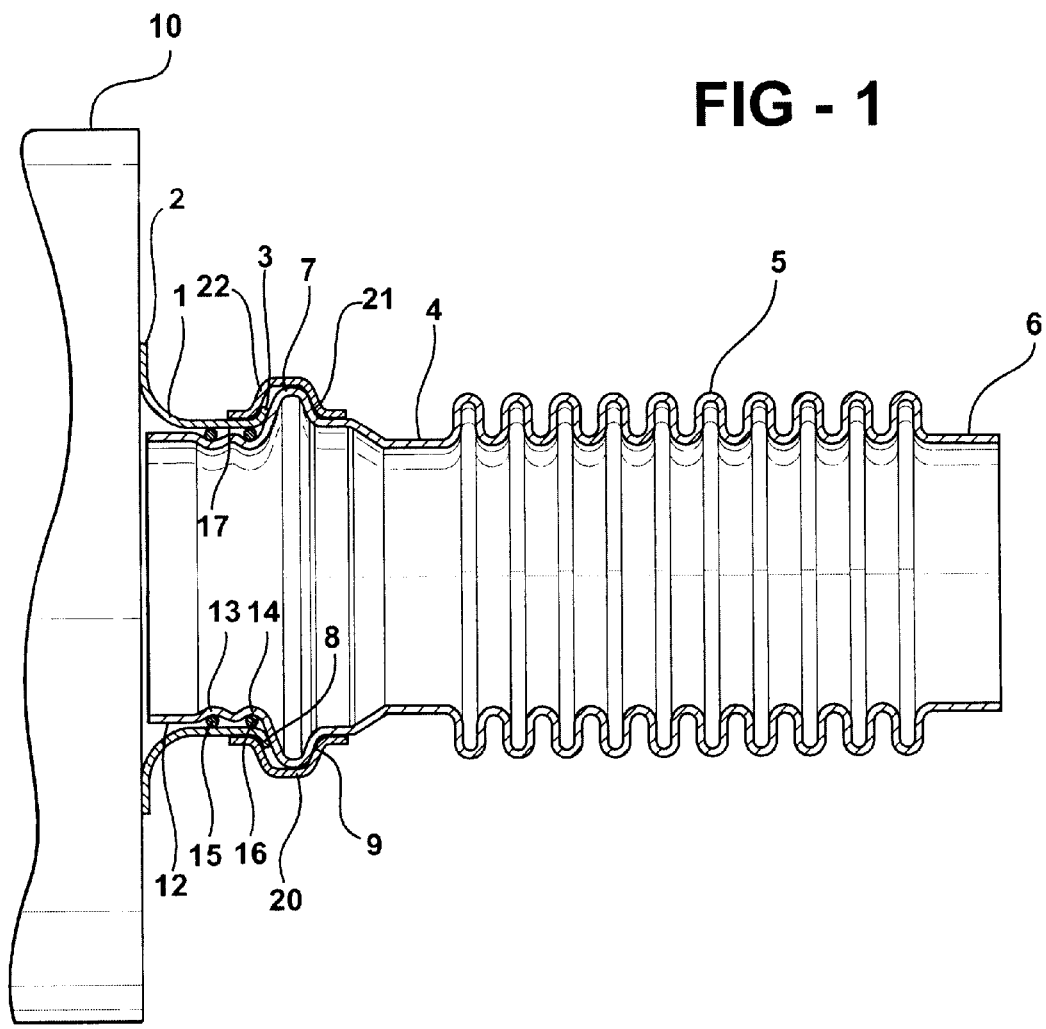
FIG. 1 shows a longitudinal section through a preferred embodiment of the invention.

In FIG. 1, a pipe connecting piece is shown at 1, which is either part of a fuel container 10 or is firmly connected to the latter by means of a flange 2. The fuel container 10 may be metal or a suitable plastic. The pipe connecting piece 1 ends in a conically widened rim 3. A pipe 4, a filling pipe in the exemplary embodiment shown, has on its side facing away from the pipe connecting piece 1, a bellows 5 and a rear end 6, which leads to a filling nozzle (not shown). On the side of the bellows 5 facing the pipe connecting piece 1, the pipe 4 is widened and forms an annular bead 7 which, in longitudinal section, has an oblique flank 8, 9 on both sides. The annular bead 7 is adjoined by a cylinder 12, which has a first circumferential groove 13 and a second circumferential groove 14, which are intended to accommodate a first sealing ring 15 and a second sealing ring 16. In FIG. 1, it can be seen that the radius of the grooves 13, 14 is somewhat greater than the radius of the sealing rings 15, 16, which are illustrated here in the uncompressed state for reasons of simplicity. In actual fact, they are oval when installed and, on the inside, rest in the grooves 13, 14 over the entire area and, on the outside, rest on the cylindrical inner face 17 of the pipe connecting piece 1. The conically widened rim 3 of the pipe connecting piece 1 rests on the first oblique flank 8 of the annular bead 7.

The sealing rings 15, 16 are preferably O-rings made of a fuel-resistant elastomer; the material or the shape of the second sealing ring 16 can additionally also exert a vapor-barring action.

The connecting member used in the preferred embodiment for the pipe connecting piece 1 and the pipe 4 is a clip 20, whose cross section is similar to that of the annular bead. It has a first oblique flank 21, which rests on the second oblique flank 9 of the annular bead, and a second oblique flank 22, which rests on the conically widened rim 3 of the pipe connecting piece 1.

Figure 2:
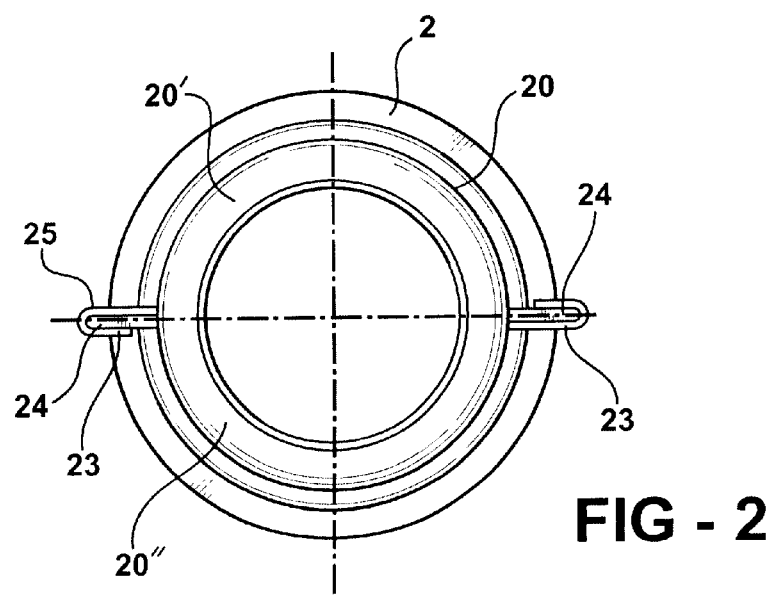
FIG. 2 shows an end view of FIG. 1.
Figure 3:
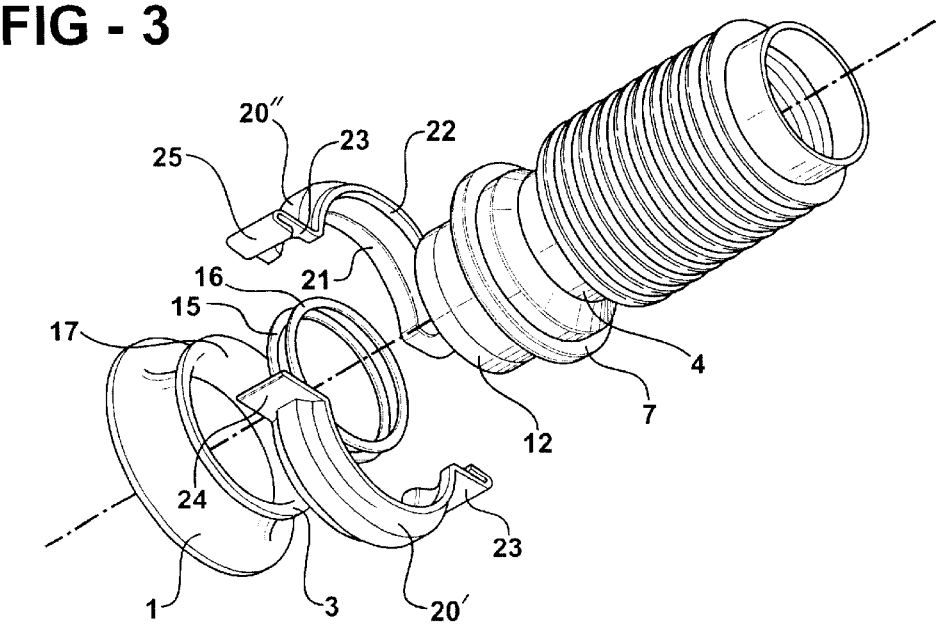
FIG. 3 shows an axionometric exploded view of the same.
Figure 4:
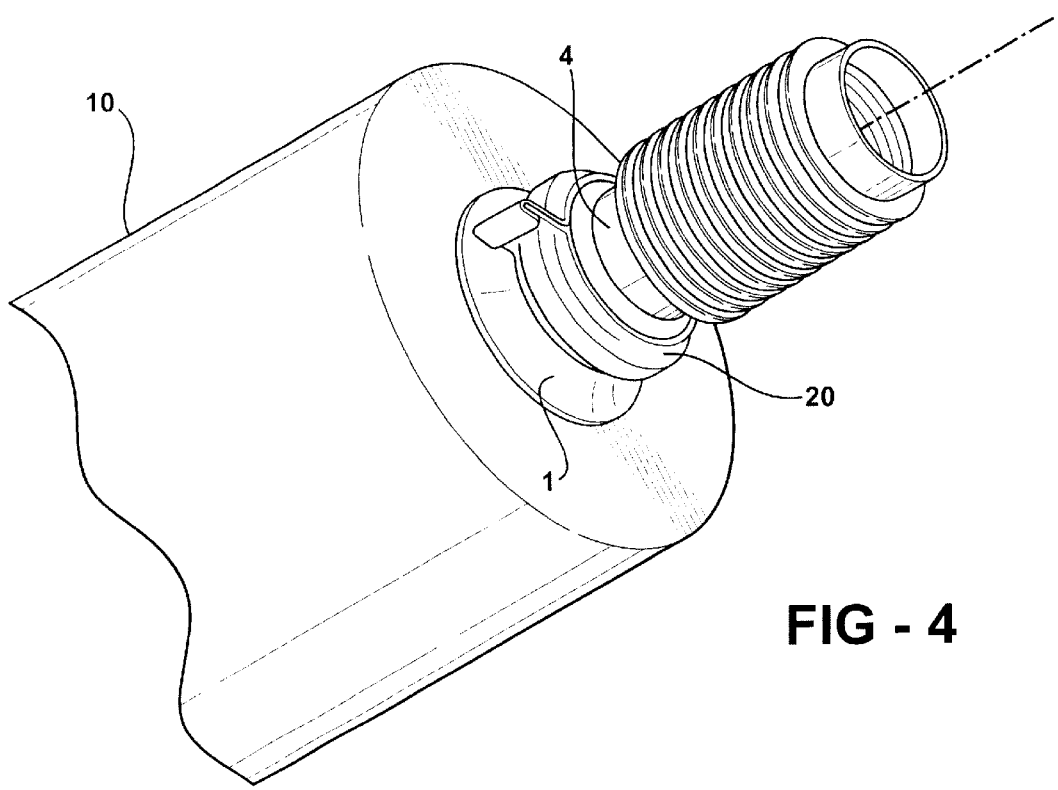
FIG. 4 shows an axionometric view of the assembled parts.

Referring to FIG. 2 and FIG. 3, the clip 20 comprises two halves 20', 20", which have radially outwardly projecting ears 23, 24 at their ends. In order to be able to design the two halves as identical parts, each one has a long ear 23 and a short ear 24, the long ear 23, after the firm connection between the two halves 20', 20", forming a bend 25 which holds the two halves firmly together.

FIG. 3 reveals that the connection between the pipe connecting piece 1 and pipe 4 can be produced in a straightforward manner. The sealing rings 15, 16 are pushed onto the cylinder 12 until they rest in the grooves 13, 14, then the cylinder 12, guided in its axial direction by its length and therefore with a true angle without any further action, is inserted into the pipe connecting piece 1 until the conically widened rim 3 rests on the annular bead 7. The two halves 20', 20" of the clip are then placed onto the annular bead 7 from both sides in such a way that they also grip the conically widened rim 3, are pressed together radially and are connected to each other by means of their ears 23, 24. One of the ears 23 can already be pre-bent, so that the short ear 24 merely has to be pushed in under the bend 25, and then the ears are connected to each other with a form fit by being folded and compressed.

What is claimed is:

1. A combination fuel container and pipe adapted to be interconnected to provide a fluid and gas impervious seal therebetween comprising:

said fuel container having an annular pipe connecting piece extending axially from said fuel container to a conically widened distal rim and having a cylindrical inner surface;

said pipe having a cylinder end configured to be received within said pipe connecting piece and defining a cylindrical outer surface;

a pair of spaced apart circumferential grooves formed in said cylinder end between said pipe and said pipe connecting piece;

a sealing ring seated in each of said grooves for providing an impervious seal between said pipe and said pipe connecting piece;

an annular bead formed in said pipe adjacent said grooves, said annular bead formed by spaced apart oblique flanks; and a connecting member operatively interconnecting said pipe and said pipe connecting piece by axially securing said annular rim of said pipe connecting piece against one of said oblique flanks of said annular bead thereby retaining said impervious seal of said sealing rings between said pipe and said fuel container, wherein said connecting member is a clip having spaced apart oblique flanks complementary to said flanks of said annular bead.

2. The combination as set forth in claim 1 wherein one of said flanks of said clip rests on the conically widened rim of the pipe connecting piece and the other of said flanks of said clip rests on said corresponding flank of the annular bead.

3. The combination as set forth in claim 2 wherein the clip comprises two halves each forming a semi-circle having opposite ends defined by radially outwardly projecting ears.

4. The combination as set forth in claim 3 wherein one of said ears of said clip halves being longer in radial direction than said other opposite ear and the clip halves being connected around said annular bead by folding said longer ear around said shorter ear of said clip halves.

5. The combination as set forth in claim 4 wherein said clip halves are symmetrical.

6. The combination as set forth in claim 5 wherein the cross section of the circumferential grooves is circular and the radius of the circular grooves is greater than the radius of the sealing rings.

7. The combination as set forth in claim 6 wherein one of said sealing rings is a fuel-resistant elastomer and said other sealing ring is an elastomer with vapor barrier characteristics.

* * * * *